(No Model.) 2 Sheets—Sheet 1.

W. A. MIDDLETON & G. M. LOOMIS.
LAND ROLLER.

No. 591,414. Patented Oct. 12, 1897.

Witnesses
E. N. Monroe
V. B. Hillyard.

Inventors
William A. Middleton
George M. Loomis,
By their Attorneys,
C. A. Snow & Co.

(No Model.) 2 Sheets—Sheet 2.

W. A. MIDDLETON & G. M. LOOMIS.
LAND ROLLER.

No. 591,414. Patented Oct. 12, 1897.

Witnesses
E. N. Monroe
V. B. Hillyard.

Inventors
William A. Middleton
George M. Loomis
By their Attorneys,
C. A. Snow & Co.

UNITED STATES PATENT OFFICE.

WILLIAM A. MIDDLETON AND GEORGE M. LOOMIS, OF JEFFERSON, OHIO.

LAND-ROLLER.

SPECIFICATION forming part of Letters Patent No. 591,414, dated October 12, 1897.

Application filed December 8, 1896. Serial No. 614,969. (No model.)

*To all whom it may concern:*

Be it known that we, WILLIAM A. MIDDLETON and GEORGE M. LOOMIS, citizens of the United States, residing at Jefferson, in the county of Ashtabula and State of Ohio, have invented a new and useful Land-Roller, of which the following is a specification.

This invention relates to implements or appliances for rolling land, and has for its object the provision of a device which will cover a comparatively broad tract when drawn over a field and which will yield so as to adapt itself to any inequalities in the surface of the ground, thereby enabling lumps and clods to be crushed or pulverized even if situated in cavities or low places in the surface of the ground and which would not be reached by land-rollers as generally constructed.

A further purpose of the invention is to relieve the necks of the team of as much weight and strain as possible, thereby lessening the burden and enabling the team to perform more work because of the diminished hardship and effort required to draw the implement over the field and turn the same for recrossing.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
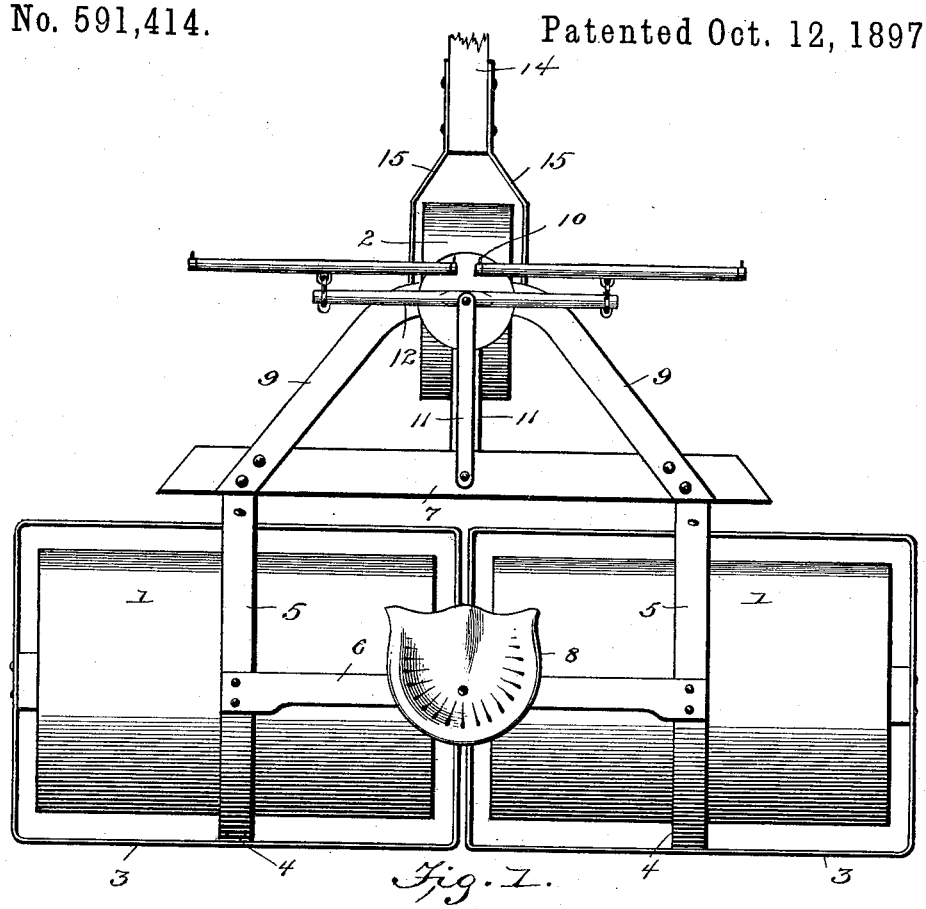
Figure 2:
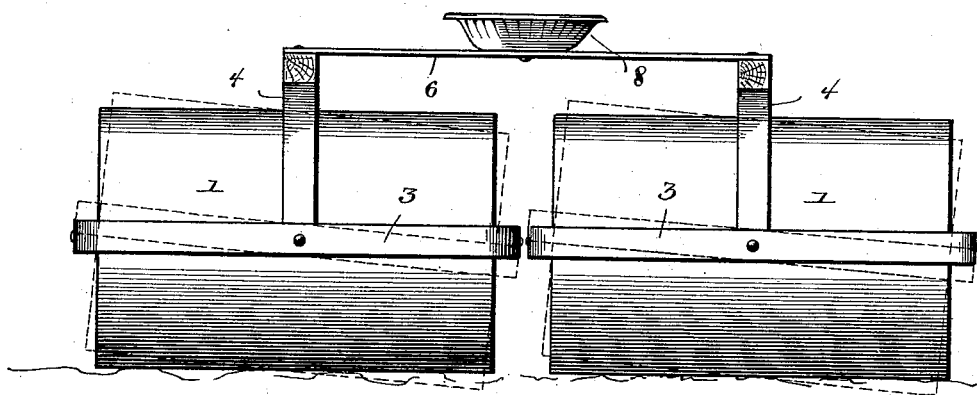
Figure 3:
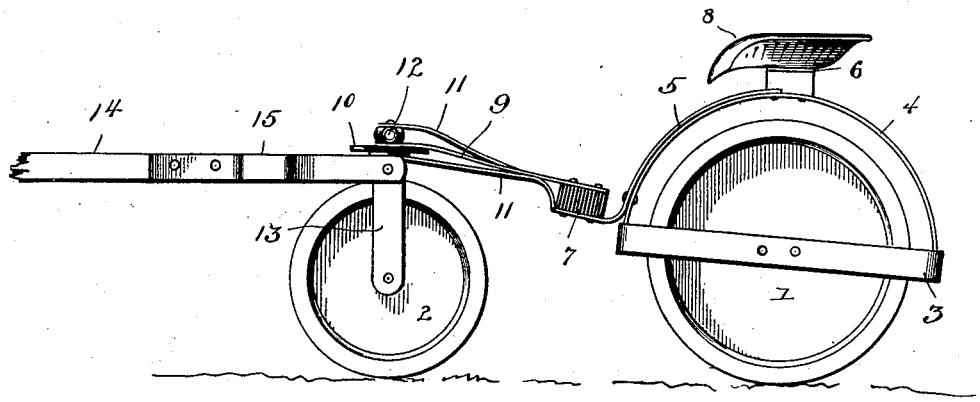
Figure 5:
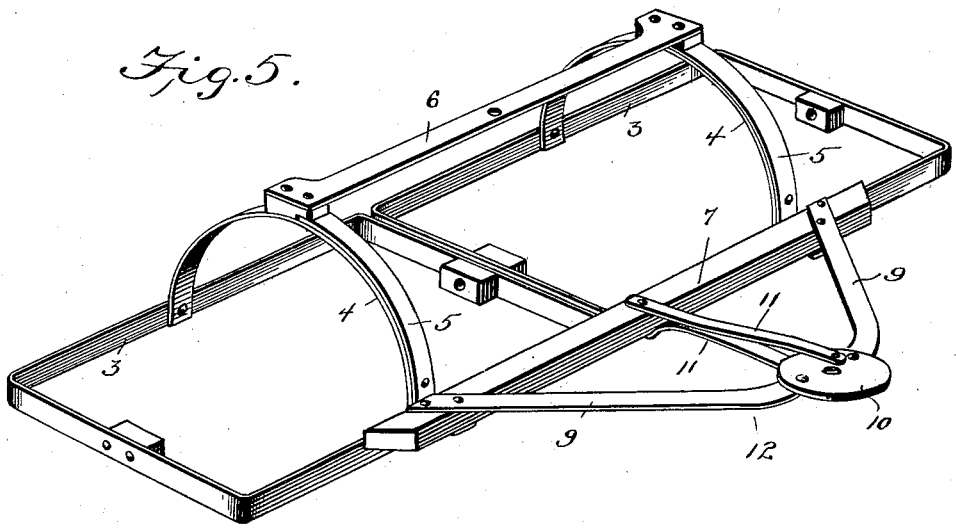
Figure 4:
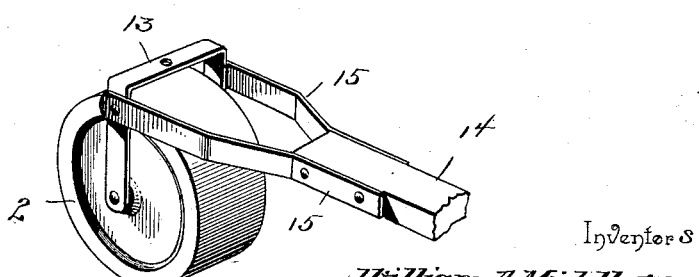

Figure 1 is a top plan view of a land-roller constructed in accordance with this invention. Fig. 2 is a rear view thereof showing the rollers relatively adjusted by dotted lines. Fig. 3 is an end view. Fig. 4 is a perspective view of the pilot-roller, its frame, and the inner or rear portion of the pole or tongue, showing the latter attached to the frame of the pilot-roller. Fig. 5 is a detail view of the frame of the implement, the rollers, and the pole or tongue being omitted.

Corresponding and like parts are referred to in the following description and indicated in the several views of the accompanying drawings by the same reference-characters.

The implement comprises rollers 1 in transverse alinement and of similar construction, a pilot-roller 2, and a suitable framework connecting the several parts.

The rollers 1 may be of any suitable construction and are journaled in frames 3 of rectangular shape and which have pivotal connection intermediate of their ends with arched bars 4, forming a part of the main frame, and by mounting the frames 3 in this manner they are adapted to tilt independently of each other, so as to adapt the rollers 1 to the roll and inequalities in the surface of the ground.

Curved bars 5 conform to the front half of the arched bars 4 and are firmly attached thereto in any convenient way, and are united at their rear ends by a coupling-bar 6 and at their front ends by a draft-bar 7, the coupling-bar being blocked up so as to extend a proper distance above the rollers 1 to admit of them tilting when the implement is in operation and forming a support for the seat 8, which is located opposite the space between the inner ends of the rollers. Hounds 9 are attached at their rear ends to the draft-bar 7, at a point opposite the curved bars 5, and have a plate 10 secured thereto at their point of convergence and are reinforced by stay-bars 11, which extend from a middle point of the draft-bar 7 to the front or meeting ends of the hounds. A doubletree 12 is mounted upon the king-bolt connecting the stay-bars, hounds, and frame 13 of the pilot-roller 2 and is located between the upper stay-bar and the plane of the hounds.

The frame 13 is of arched form and is mounted upon the king-bolt or fastening connecting the hounds, stay-bars, and doubletree, and has the pilot-roller 2 journaled to the lower ends of its side members. This pilot-roller 2 is located in advance of the main rollers 1 and opposite the space formed between the inner ends of the rollers 1, so that the ground will have every portion rolled in the track covered by the implement. By mounting the pilot-roller in the manner set forth it will adapt itself to the direction of draft and facilitate the guiding or steering of the implement, which is of especial advantage when turning to recross the field or when turning abruptly for any purpose, thereby relieving the team of the strain generally imposed upon their necks in order to turn the roller when the implement is in operation.

The pole or tongue 14 has hounds 15 secured to its rear end, and which in turn have pivotal connection with the frame 13, thereby relieving the animals or team of any weight of the implement and enabling the pole or tongue to adapt itself to the condition of the surface of the ground being rolled or treated. The hounds 15 have pivotal connection with the side members of the frame 13, near their upper ends, thereby bringing the strain nearly in the plane of the hounds 9, whereby the king-bolt connection is relieved in a great measure of strain, which would tend to bend its lower end.

The frames 3 are of rectangular shape and are constructed in any substantial manner and have pivotal connection midway of their ends to the lower extremities of the arched bars 4, thereby distributing the weight equally upon opposite sides of a line about which the frames tilt, whereby the rollers 1 will automatically and readily adapt themselves to inequalities in the surface of the ground as the implement is drawn thereover, thereby insuring the ground being treated alike within the extent and capacity of the roller.

Having thus described the invention, what is claimed as new is—

1. In a land-roller, the combination of a draft-bar, bars secured to the draft-bar and curving rearwardly and upwardly, arched bars disposed in the line of motion of the implement and secured to the said curved bars, a coupling-bar connecting the arched bars intermediate of their ends, independent frames disposed in transverse alinement and having pivotal connection between their ends with the extremities of the arched bars, so as to tilt vertically and at right angles to the line of motion of the machine, and rollers journaled to the pivoted frames, substantially as described.

2. In a land-roller, the combination of a draft-bar, independent frames having pivotal connection with the draft-bar and provided with rollers, hounds having connection with the draft-bar and provided with a plate at their front ends, a frame of arched form having pivotal connection with the said plate and bearing a pilot-roller, and a pole or tongue having pivotal connection with the side members of the arched frame near their upper ends, substantially as set forth for the purpose described.

3. In a land-roller, the combination of a draft-bar, longitudinally-disposed curved bars having connection at their front ends with the end portions of the draft-bar, arched bars secured to the curved bars, a coupling-bar connecting the arched bars, independent frames having pivotal connection with the arched bars and bearing-rollers, hounds secured to the aforesaid draft-bar, a frame bearing a pilot-wheel having pivotal connection with the front ends of the hounds, and a pole or tongue having pivotal connection with the pilot-roller-bearing frame, substantially as set forth.

4. In a land-roller, a draft-bar, curved bars attached at their front ends to the draft-bar, a coupling-bar connecting the rear ends of the curved bars and supporting a seat, arched bars rigidly connected to the curved bars, frames having pivotal connection intermediate of their ends with the extremities of the arched bars, rollers journaled to the pivoted frames, hounds having connection with the aforesaid draft-bar, a pilot-roller having its frame pivotally connected with the hounds so as to turn about a vertical axis, and a pole or tongue having pivotal connection with the frame of the pilot-roller, substantially in the manner set forth for the purpose described.

In testimony that we claim the foregoing as our own we have hereto affixed our signatures in the presence of two witnesses.

WILLIAM A. MIDDLETON.
GEORGE M. LOOMIS.

Witnesses:
CHAS. LAWYER, Jr.,
H. J. REDMOND.